A. J. ALLEN.
CONNECTING TERMINAL.
APPLICATION FILED AUG. 12, 1911.
1,040,107.
Patented Oct. 1, 1912.
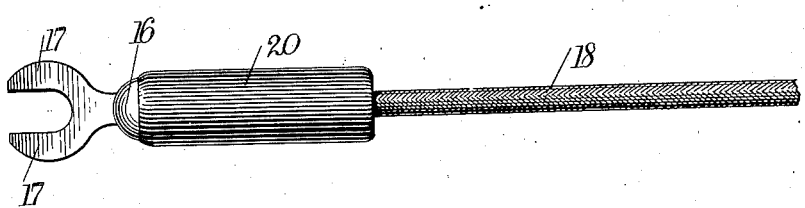
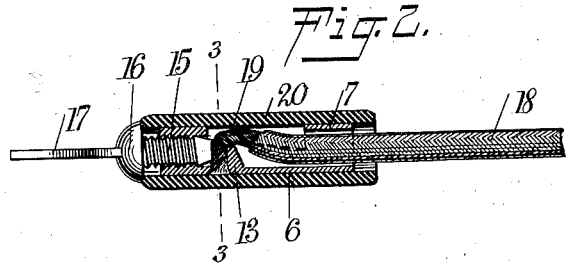 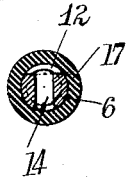
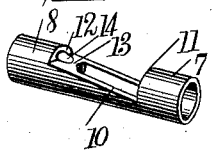 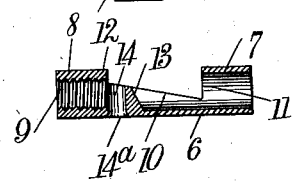
WITNESSES
INVENTOR
Albert J. Allen
BY
ATTORNEYS

UNITED STATES PATENT OFFICE.

ALBERT JAY ALLEN, OF NEW YORK, N. Y.

CONNECTING-TERMINAL.

1,040,107.  Specification of Letters Patent.  Patented Oct. 1, 1912.

Application filed August 12, 1911. Serial No. 643,720.

*To all whom it may concern:*

Be it known that I, ALBERT J. ALLEN, a citizen of the United States, and a resident of the city of New York, borough of Brooklyn, in the county of Kings and State of New York, have invented a new and Improved Connecting-Terminal, of which the following is a full, clear, and exact description.

My invention relates to connecting terminals, my more particular purpose being to provide a contact member to be secured upon the end of a flexible conducting cord or the like, said member having a portion serving the double purpose of a wing screw for holding said member upon said cord and fitting upon a binding post for the purpose of establishing electrical communication from said cord to the same.

My invention further comprehends a connecting terminal, the parts of which are of simple construction, and adapted to be cheaply made, said terminal being easily mounted upon or disconnected from the conducting cord, wire or other member with which it is associated.

Reference is to be had to the accompanying drawings forming a part of this specification, in which similar characters of reference indicate corresponding parts in all the views, and in which—

Figure 1 is a plan view of my improved connecting terminal mounted upon a conducting cord; Fig. 2 is a longitudinal section through the same; Fig. 3 is a cross section on the line 3—3 of Fig. 2; Fig. 4 is a detail showing in perspective the metallic sleeve forming a part of the connecting terminal; and Fig. 5 is a detail showing in longitudinal section the sleeve appearing in Fig. 4.

A metallic sleeve 6 is provided with two cylindrical portions 7, 8, the portion 8 being thicker than the portion 7, and provided internally with a thread 9. The sleeve 6 is provided with a slot 10 bounded by walls 11, 12, the slot being deeper adjacent to the wall 11. The sleeve 6 is provided with a partition 13, and extending through this partition is a hole 14, one end 14ª of which is slightly flared. A screw shank 15 is provided externally with a thread which fits into the thread 9. Mounted upon the screw shank 15 is a hemispherical head 16 and pairs of wings 17, the latter being integral with each other and with the head 16 and the shank 15. The wings 17 have a twofold purpose: First, they serve as a contact member to be gripped by a binding post or the like, and, second, they may be used for turning the screw shank 15.

A flexible cord is shown at 18 and is provided with metallic strands 19 extending centrally through it.

A sleeve 20, of insulating material, preferably hard rubber, encircles the metallic sleeve 6 and fits neatly upon the same, but may easily be removed from the sleeve by simply being slipped to the right, according to Fig. 2.

The operation of my device is as follows: The flexible cord 18, with the metallic strands 19 extending centrally from its end, is partly drawn through the cylindrical portion 7 of the sleeve 6, and the metallic strands 19 are thereupon bent over the edge of the partition 13 and forced through the hole 14. The screw shank 15 is now inserted within the cylindrical portion 8 and turned by aid of the wings 17, in much the same manner that a wing bolt or wing nut is rotated. The screw shank 15 is thus forced tightly against the strands 19. The sleeve 20 is now slipped over the flexible cord 18, until one end of the sleeve 20 lodges against the hemispherical head 16. The device now appears as indicated in Figs. 1 and 2. The sleeve 20 may be used as a handle and the wings 17 are brought into engagement with a binding post and there gripped by a convenient fastening member so that the flexible cord 18 is in metallic communication with the binding post.

I do not limit myself to the precise form of sleeve 6 shown and described, neither do I limit myself to the particular arrangement of the several parts nor to any special material to be employed in their construction, the scope of my invention being commensurate with my claims.

Having thus described my invention, I claim as new and desire to secure by Letters Patent:

1. A connecting terminal comprising a sleeve provided with an opening for receiving a wire and with an aperture extending substantially at right angles to the general direction of the sleeve designed to receive the end of said wire, and a fastening member projecting into said sleeve and clamping the end of said wire in said aperture, said fastening member forming a continuation of said sleeve.

2. A connecting terminal, comprising a metallic sleeve, provided with two cylindrical portions, one of said cylindrical portions being threaded internally, said sleeve being further provided with a hole and with a partition partially bounding said hole, a screw fitting into said internally threaded portion and provided with a portion for extending into said hole, said screw being further provided with a hemispherical head and with a contact portion having the form of wings, whereby said screw may be turned, said wings being adapted for engagement with a conductor, and a sleeve of insulating material encircling said metallic sleeve and lodging against said hemispherical head.

3. A connecting terminal comprising a sleeve formed with an apertured projection substantially filling the sleeve in a transverse direction and with a notch extending on both sides of said projection, said sleeve being adapted to accommodate a wire and said apertured projection being designed to accommodate the end of said wire, a fastening member formed with an engaging portion, and a threaded shank having an extension extending therefrom, said threaded shank being designed to be screwed into one end of said sleeve for pressing the end of the wire in said apertured projection in said sleeve.

In testimony whereof I have signed my name to this specification in the presence of two subscribing witnesses.

ALBERT JAY ALLEN.

Witnesses:
WALTON HARRISON,
PHILIP D. ROLLHAUS.